(12) United States Patent
Wu et al.

(10) Patent No.: US 11,632,165 B2
(45) Date of Patent: Apr. 18, 2023

(54) BEAM FAILURE DETECTION METHOD, INFORMATION CONFIGURATION METHOD, TERMINAL AND NETWORK DEVICE

(71) Applicant: VIVO MOBILE COMMUNICATION CO.,LTD., Guangdong (CN)

(72) Inventors: Yumin Wu, Chang'an Dongguan (CN); Yu Yang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/071,808

(22) Filed: Oct. 15, 2020

(65) Prior Publication Data
US 2021/0028853 A1   Jan. 28, 2021

Related U.S. Application Data

(63) Continuation of application No. PCT/CN2019/082659, filed on Apr. 15, 2019.

(30) Foreign Application Priority Data

Apr. 16, 2018   (CN) .......................... 201810338768.8

(51) Int. Cl.
*H04B 7/08*   (2006.01)
*H04W 16/28*   (2009.01)
(Continued)

(52) U.S. Cl.
CPC .......... *H04B 7/088* (2013.01); *H04B 7/0626* (2013.01); *H04L 5/0051* (2013.01);
(Continued)

(58) Field of Classification Search
CPC ... H04W 24/02; H04W 16/28; H04W 56/001; H04B 7/0413; H04B 7/0626;
(Continued)

(56) References Cited

U.S. PATENT DOCUMENTS

2016/0353510 A1   12/2016   Zhang et al.
2018/0160467 A1*  6/2018   Quan ................... H04W 76/19
(Continued)

FOREIGN PATENT DOCUMENTS

| CN | 107005858 A | 8/2017 |
|---|---|---|
| WO | 2019170159 A1 | 9/2019 |
| WO | 2019191262 A1 | 10/2019 |

OTHER PUBLICATIONS

International Search Report and Written Opinion issued in corresponding application No. PCT/CN2019/082659, dated Oct. 29, 2020.
(Continued)

*Primary Examiner* — Derrick V Rose
(74) *Attorney, Agent, or Firm* — Maschoff Brennan (57) ABSTRACT

A beam failure detection method, an information configuration method, a terminal and a network device are provided, and the method includes: receiving configuration information used for beam failure detection; performing, according to the received configuration information, a preset operation on a timer and/or a counter for beam failure detection corresponding to a target beam; where the target beam is one of beams supported by the terminal, or a beam corresponding to a Bandwidth Part BWP supported by the terminal.

17 Claims, 2 Drawing Sheets

Receiving configuration information used for beam failure detection — 11

Performing, according to the recevied configuration information, a preset operation on the timer and/or the counter for beam failure detection corresponding to a target beam — 12

(51) Int. Cl.
*H04L 5/00* (2006.01)
*H04W 56/00* (2009.01)
*H04B 7/06* (2006.01)

(52) U.S. Cl.
CPC .......... *H04L 5/0092* (2013.01); *H04W 16/28* (2013.01); *H04W 56/001* (2013.01)

(58) Field of Classification Search
CPC .... H04B 7/088; H04B 7/0602; H04B 7/0695; H04L 5/0051; H04L 5/0092; G03B 27/545
See application file for complete search history.

(56) References Cited

U.S. PATENT DOCUMENTS

2019/0281480 A1* 9/2019 Wei ..................... H04B 7/0695
2019/0372830 A1* 12/2019 Zhang .................. H04W 24/10

OTHER PUBLICATIONS

Asustek, Missing Parts in the Beam Failure Detection and Recovery Procedure, 3GPP TSG-RAN WG2 Meeting #101bis, Sanya, China, R2-1804278, Apr. 16-20, 2018.
Sony, Beam Failure Detection and Maintenance, 3GPP TSG-RAN, WG2 #101-Bis, Sanya China, Tdoc R2-1805168, Apr. 16-20, 2018.
OPPO, The Timer and Counter Maintenance of BFR Procedure, 3GPP TSG-RAN2 #101 bis, Sanya China, R2-1806183, Apr. 16-20, 2018.
Chinese Office Action issued in corresponding application No. 201810338768.8, dated Apr. 20, 2020.
OPPO, The Timer and Counter Maintenance of BFR Procedure, 3 GPP TSG-RAN2 #101 bis, Sanya China, R2-1804502, Apr. 16-20, 2018.
ZTE, Sanechips, Consideration of Beam Failure Detection During BWP Switch, 3GPP TSG-RAN WG2 Meeting #101bis, Sanya China, R2-1804874, Apr. 16-20, 2018.
European Search Report dated May 7, 2021 as received in application No. 19787868.9.
"MAC Functions to Support Beam Management and Beam Recovery" 3GPP TSG-RAN WG2 #100, R2-1712870, Reno, USA, Nov. 27-Dec. 1, 2017. Mediatek Inc.
"Beam Failure Recovery in Scell and contention-based BFR on SpCell" 3GPP TSG-RAN WG2 #101Bis, Tdoc R2-1805414, Sanya, P.R. of China, Apr. 16-20, 2018. Ericsson.
"Remaining Issues on beam failure recovery" 3GPP TSG RAN WG2 Meeting #101bis, R2-1805864, Sanya, China, Apr. 16-20, 2018. Sharp.
Japanese Office Action dated Nov. 30, 2021 as received in application No. 2020-556755.
"Radio Resource Control (RRC) protocol specification" 3GPP TS 38.331 V15.1.0 (Mar. 2018), 3rd Generation Partnership Project; Technical Specification Group Radio Access Network.
"Remaining details of RLM" 3GPP TSG RAN WG1 Meeting AH 1801, R1-1800086, Jan. 22, 2018. ZTE, Sanechips.

* cited by examiner

BEAM FAILURE DETECTION METHOD, INFORMATION CONFIGURATION METHOD, TERMINAL AND NETWORK DEVICE

CROSS-REFERENCE TO RELATED APPLICATION

This application is a continuation application of a PCT application No. PCT/CN2019/082659 filed on Apr. 15, 2019, which claims a priority to the Chinese patent application No. 201810338768.8 filed in China on Apr. 16, 2018, a disclosure of which is incorporated herein by reference in its entirety.

TECHNICAL FIELD

The present disclosure relates to the field of communications technologies, and in particular, relates to a beam failure detection method, an information configuration method, a terminal and a network device.

BACKGROUND

In fifth generation ($5^{th}$ Generation, 5G) mobile communication systems, or new radio (New Radio, NR) systems, a supported operating frequency band is raised to above 6 GHz and the highest supported operating frequency band is about 100 GHz. There are relatively abundant idle frequency resources in high-frequency bands, which may provide greater throughput for data transmission. In order to achieve an objective of a downlink transmission rate of 20 Gbps and an uplink transmission rate of 10 Gbps, high-frequency antennas and a MIMO technology with larger scale and more antenna ports will be introduced. A high-frequency signal has a short wavelength, more antenna elements may be arranged on a panel with the same size compared with a low-frequency band, and a beam with stronger directivity and narrower lobes is formed by adopting beamforming technology. Large-scale antenna arrays are used in massive (Massive) MIMO technology, which may greatly improve efficiency of system frequency band utilization and support a larger number of access users.

In a high-frequency band communication system, because a wavelength of a radio signal is short, a case that signal propagation is blocked is more likely to happen, which causes the signal propagation to be interrupted. If a radio link reconstruction method in the prior art is adopted, it is time-consuming. Therefore, a beam failure recovery (Beam Failure Recovery, BFR) mechanism is introduced.

In addition, in 5G systems, a terminal may only support a relatively small operating bandwidth (such as 5 MHz), and a cell on a network device side may support a relatively large bandwidth (such as 100 MHz), a small bandwidth part, on which the terminal operates, of the large bandwidth is a bandwidth part (Bandwidth Part, BWP). The network device side may configure the terminal to support one or more BWPs, and may use a BWP switching command to change a currently activated BWP of the terminal, that is, a new BWP is activated and the current activated BWP is deactivated. In addition, in the 5G system, the terminal may also support multiple beams.

In a current beam failure detection process, the terminal maintains only one timer and one counter for beam failure detection for each cell, so the terminal may control the counter for beam failure detection to increase by one, regardless of a beam corresponding to any BWP of multiple BWPs being detected, or whichever beam of the multiple beams encounters a beam failure instance. For example, a terminal corresponds to a beam 1 and a beam 2, when the beam 1 is operating, the terminal detects that four beam failure instances occur on the beam 1; when the terminal switches to operating on the beam 2, the terminal detects that one beam failure instance occurs on the beam 2 again, then the terminal controls the counter for beam failure detection to count 5 times and determines that a beam failure event occurs. In fact, a small number of beam failure instances occur on the beam 2, and a beam quality of the beam 2 is better, but the terminal will mistakenly determine that both the beam 1 and the beam 2 are unavailable if adopting the existing beam failure detection mechanism, and accuracy of beam failure detection results is low.

SUMMARY

Embodiments of the present disclosure provide a beam failure detection method, an information configuration method, a terminal and a network device, to solve a problem of low accuracy of beam failure detection in the prior art.

In a first aspect, an embodiment of the present disclosure provides a beam failure detection method, and the method is performed by a terminal side and includes: receiving configuration information used for beam failure detection; performing, according to the received configuration information, a preset operation on a timer and/or a counter for beam failure detection corresponding to a target beam; wherein, the target beam is one of beams supported by the terminal, or a beam corresponding to a Bandwidth Part (BWP) supported by the terminal.

In a second aspect, an embodiment of the present disclosure further provides a terminal, and the terminal includes: a reception module, used to receive configuration information used for beam failure detection; a processing module, used to perform, according to the received configuration information, a preset operation on a timer and/or a counter for beam failure detection corresponding to a target beam; wherein, the target beam is one of beams supported by the terminal, or a beam corresponding to a Bandwidth Part (BWP) supported by the terminal.

In a third aspect, an embodiment of the present disclosure provides a terminal, and the terminal includes a processor and a storage, the storage stores a program executable by the processor, when the program is executed by the processor, the processor implements the steps of the beam failure detection method as described above.

In a fourth aspect, an embodiment of the present disclosure provides an information configuration method. The method is performed by a network device side and includes: sending configuration information used for beam failure detection; wherein the configuration information is used to indicate: a timer and/or a counter for beam failure detection corresponding to a target beam, the target beam is one of beams supported by a terminal, or a beam corresponding to a Bandwidth Part (BWP) supported by a terminal.

In a fifth aspect, an embodiment of the present disclosure provides a network device, and the network device includes: a sending module, used to send configuration information used for beam failure detection; wherein the configuration information is used to indicate: a timer and/or a counter for beam failure detection corresponding to a target beam, the target beam is one of beams supported by a terminal, or a beam corresponding to a Bandwidth Part (BWP) supported by a terminal.

In a sixth aspect, an embodiment of the present disclosure provides a network device, the network device includes a processor and a storage, the storage stores a program executable by the processor, and when the program is executed by the processor, the processor implements the steps of the information configuration method as described above.

In a seventh aspect, an embodiment of the present disclosure provides a computer readable storage medium including a program stored thereon, and when the program is executed by a processor, the processor implements the steps of the information configuration method as described above.

In this way, in the embodiments of the present disclosure, a timer and/or a counter for beam failure detection configured by a network device for the terminal corresponds to a target beam, which may improve accuracy of beam failure detection and avoid a waste of resources caused by available beams being misjudged as unavailable.

BRIEF DESCRIPTION OF THE DRAWINGS

In order to more clearly illustrate the technical solutions in embodiments of the present disclosure, the drawings used in description of the embodiments of the present disclosure will be briefly introduced below. Obviously, the drawings in the following description are only some embodiments of the present disclosure. Based on these drawings, other drawings may be obtained by those skilled in the art without paying any creative work.

DETAILED DESCRIPTION

Exemplary embodiments of the present disclosure will be described in more detail below with reference to the accompanying drawings. Although exemplary embodiments of the present disclosure are shown in the drawings, it should be understood that the present disclosure may be implemented in various forms, without being limited by the embodiments described herein. Rather, these embodiments are provided so that the present disclosure will be thorough and complete, and will fully convey the scope of the present disclosure to those skilled in the art.

The terms "first", "second" and the like in the specification and claims of the present application are used to distinguish similar objects, and are not necessarily used to describe a particular order or chronological order. It is to be understood that terms used in this way may be interchangeable under appropriate circumstances, so that embodiments of the present application described herein may be implemented in a sequence other than those illustrated or described herein. In addition, such terms as "comprise", "have" and any variants thereof are intended to cover non-exclusive inclusions, for example, a process, a method, a system, a product, or a device that includes a series of steps or units is not necessarily limited to those steps or units clearly listed, but may include other steps or units not explicitly listed or inherent to such processes, methods, products or devices.

Figure 1:
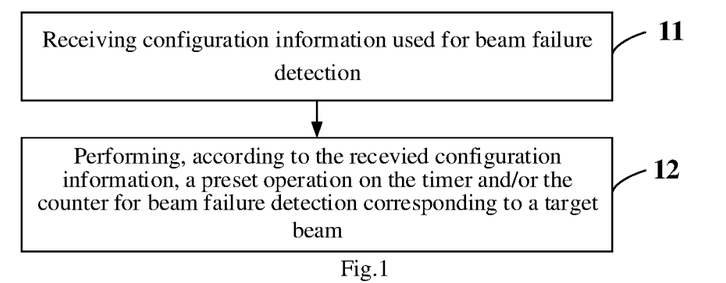
FIG. 1 is a schematic flowchart of a beam failure detection method according to an embodiment of the present disclosure.

An embodiment of the present disclosure provides a beam failure detection method performed by a terminal side. As shown in FIG. 1, the method includes the following Step 11 and Step 12.

Step 11: receiving configuration information used for beam failure detection.

In a high-frequency band communication system, a case that signal propagation is blocked is more likely to happen, which causes the signal propagation to be interrupted. A BFR mechanism is introduced for fast recovery of a transmission link. Specifically, the BFR mechanism includes: beam failure detection, identification of new candidate beams, sending a beam failure recovery request (Beam Failure Recovery request, BERQ) and monitoring response information sent from a network device based on the beam failure recovery request. The beam failure detection is specifically that: the terminal measures a beam failure detection reference signal (Beam Failure Detection Reference Signal, BFD RS) at a physical layer, and determines whether a beam failure event occurs according to a result of the measurement. A condition for the terminal to determine occurrence of the beam failure event include that: if a metric (metric) of all serving control beams is detected to satisfy a preset condition, such as a block error ratio (Block Error Ratio, BLER) of a physical downlink control channel (Physical Downlink Control Channel, PDCCH) exceeds a preset threshold, it is determined as a beam failure instance, and a physical layer of the terminal reports an indicator to an upper-layer, such as a media access control (Media Access Control, MAC) layer, and a process of the reporting is periodic. Correspondingly, if the physical layer of the terminal determines that no beam failure instance occurs, no indicator is sent to an upper-layer. The upper-layer of the terminal uses a counter to count indicators reported by the physical layer. When the maximum count configured by a network is reached, the terminal determines that a beam failure event occurs. Configuration information used for beam failure detection includes parameter information involved in a beam failure detection process. For example, the configuration information includes at least: a reference signal configuration for beam failure detection (e.g., failure Detection Resources), a counter configuration used for beam failure detection (e.g., beam failure Instance Maximum count), a timer configuration for beam failure detection (beam Failure Detection timer), etc.

Step 12: performing, according to the received configuration information, a preset operation on the timer and/or the counter for beam failure detection corresponding to a target beam.

The target beam is one of beams supported by the terminal, or a beam corresponding to a Bandwidth Part (BWP) supported by the terminal. That is, the timer used for beam failure detection in the configuration information corresponds to one of the beams supported by the terminal, or the timer corresponds to the beam corresponding to the BWP supported by the terminal. The counter used for beam failure detection in the configuration information corresponds to one of the beams supported by the terminal, or the counter corresponds to the beam corresponding to the BWP supported by the terminal. In this way, the timer and/or the counter used for beam failure detection corresponds to a smaller number of beams, which may improve accuracy of beam failure detection and avoid a waste of resources caused by available beams being misjudged as unavailable.

The present embodiment will further illustrate the beam failure detection method in combination with different scenarios in the following.

Scenario 1: in a case that the configuration information is first configuration made by the network device, that is, when the network device configures configuration information used for beam failure detection for the terminal for the first time, the configuration information may include at least one of the following information: 1) timer information, used to indicate a timer configuration for beam failure detection, such as detection time of failure detection; 2) counter information, used to indicate a counter configuration for beam failure detection, such as the maximum count of failure detection instances; 3) BWP identifier information corresponding to the timer information, used to indicate a BWP corresponding to the timer information, wherein, one BWP corresponds to one independent timer, and values of timers corresponding to different BWPs may be the same or different; 4) BWP identifier information corresponding to the counter information, used to indicate a BWP corresponding to the counter information, wherein, one BWP corresponds to one independent counter, and values of counters corresponding to different BWPs may be the same or different, in other words, the maximum count of beam failure detection instances corresponding to different BWPs may be the same or different; 5) beam identifier information corresponding to the timer information, in other words, a beam identifier corresponding to a timer configuration for the beam failure detection in the configuration information for beam failure detection, used to indicate a beam corresponding to the timer information, wherein one beam corresponds to one independent timer, and values of timers corresponding to different beams may be the same or different; or 6) beam identifier information corresponding to the counter information, in other words, a beam identifier corresponding to a counter configuration for beam failure detection in the configuration information for beam failure detection, used to indicate a beam corresponding to the counter information; one beam corresponds to one independent counter, and values of counters corresponding to different beams may be the same or different, in other words, maximum counts of beam failure detection instances corresponding to different beams may be the same or different.

The beam identifier information includes at least one of: synchronous signal block (Synchronous Signal Block, SSB) identifier information, such as a SSB identifier; channel state information-reference signal (Channel State Information-Reference Signal, CSI-RS) identifier information, such as a CSI-RS identifier; or spatial relationship configuration identifier information among beams, where spatial relationship configuration information includes but is not limited to: a transmission configuration indicator (Transmission Configuration Indicator, TCI), or quasi-co location (Quasi-co Location, QCL) relationship information. The QCL relationship indicates that at least one of Doppler frequency offset, Doppler spread, average delay, delay spread, or spatial reception parameters among different beams is quasi co-located, and may be indicated by a QCL type, where QCL-Type A is used to indicate that the Doppler frequency offset, the Doppler spread, the average delay and the delay spread are quasi co-located or the same; QCL-Type B is used to indicate that the Doppler frequency offset and Doppler spread are quasi co-located or the same; QCL-Type C is used to indicate that the Doppler frequency offset and the average delay are quasi co-located or the same; QCL-Type D is used to indicate that the spatial reception parameters are quasi co-located or the same.

A BWP indicated by the BWP identifier information is an activated BWP or a deactivated BWP, and a beam indicated by the beam identifier information is a serving beam (or called an activated beam) or a non-serving beam (or called a deactivated beam).

In the present scenario, Step 12 may include: controlling, in a case that a physical layer detects that a beam failure instance occurs on the target beam, the physical layer to send beam failure indicator information to an upper-layer; performing, according to configuration information, a preset operation on the timer and/or the counter for beam failure detection corresponding to the target beam after the upper-layer receives the beam failure indicator information. The terminal measures a BFD RS at a physical layer, and determines whether a beam failure event occurs according to the measurement result. A condition for the terminal to determine occurrence of a beam failure event include that: if it is detected that a metric of the target beam satisfies a preset condition, for example, a BLER of a PDCCH exceeds a preset threshold, this is determined as a beam failure instance, the physical layer of the terminal reports beam failure indicator information to an upper-layer. The upper-layer may be a MAC layer, and the reporting process is periodic. In this way, the upper-layer of the terminal uses a counter to count indicators reported by the physical layer, and uses a timer to perform timekeeping.

A way for the upper-layer to maintain the timer includes, but is not limited to that: 1) one timer for beam failure detection is maintained for each cell, for example, each active cell corresponds to an independent timer for beam failure detection; or 2) one timer for beam failure detection is maintained for each BWP, for example, each activated (or deactivated) BWP corresponds to an independent timer for beam failure detection; or 3) one timer for beam failure detection is maintained for each beam, for example, each serving (or non-serving) beam corresponds to an independent timer for beam failure detection.

Similar to a way of maintaining the timer, a way for the upper-layer to maintain the counter includes, but is not limited to that: 1) one counter for beam failure detection is maintained for each cell, for example, each active cell corresponds to an independent counter for beam failure detection; or 2) one counter for beam failure detection is maintained for each BWP, for example, each activated (or deactivated) BWP corresponds to an independent counter for beam failure detection; or 3) one counter for beam failure detection is maintained for each beam, for example, each serving (or non-serving) beam corresponds to an independent counter for beam failure detection.

It should be noted that, the upper-layer of the terminal maintains a timer for beam failure detection and a counter for beam failure detection in the same way. For example, one independent timer for beam failure detection is maintained for each BWP, and accordingly, an independent counter for beam failure detection is also maintained for each BWP.

Further, the beam failure indication information sent by the physical layer of the terminal to the upper-layer may include at least one of: 1) BWP identifier information corresponding to the target beam, used to indicate a BWP identifier corresponding to the target beam on which a beam failure instance occurs; or 2) beam identifier information corresponding to the target beam, used to indicate a beam identifier of a target beam instance where a beam failure occurs.

Optionally, in the present scenario, performing, according to the received configuration information, the preset operation on the timer and/or the counter for beam failure detection corresponding to the target beam includes but is not limited to the following ways: starting or restarting a timer corresponding to the target beam in a case that a beam failure instance occurring on the target beam is detected. Optionally, the terminal measures a BFD RS at the physical layer, if it is detected that a metric of the target beam satisfies a preset condition, for example, a BLER of a PDCCH exceeds a preset threshold, it is determined as a beam failure instance, the physical layer of the terminal reports beam failure indication information to an upper-layer. In this way, the upper-layer of the terminal starts or restarts a timer corresponding to the target beam; if the timer expires within a period of time, it is determined that no beam failure event occurs, and the counter corresponding to the target beam is reset, for example, the counter is set to a value of 0 or to a maximum count.

Taking one BWP corresponding to one independent timer as an example, when a BWP indicated by BWP identifier information determined by the upper-layer of the terminal in beam failure indication information is the same as a BWP corresponding to a timer for beam failure detection, the timer for beam failure detection is started or restarted after the beam failure indication information is received.

Taking one beam corresponding to one independent timer as an example, when a beam indicated by beam identifier information determined by the upper-layer of the terminal in a beam failure indicator information is the same as a beam corresponding to a timer for beam failure detection, the timer for beam failure detection is started or restarted after the beam failure indicator is received.

On the other hand, a counter corresponding to the target beam is controlled to increase or decrease by one in a case that a beam failure instance occurring on the target beam is detected. The terminal measures a BFD RS at the physical layer, if it is detected that a metric of the target beam satisfies a preset condition, it is determined as one beam failure instance, the physical layer of the terminal reports beam failure indicator information to an upper-layer. Assuming that an initial value of the timer is 0, after receiving the beam failure indicator information from the physical layer, the upper-layer of the terminal controls the counter corresponding to the target beam to increase by one. If the counter reaches the maximum count before the timer corresponding to the target beam expires, it is determined that a beam failure event occurs; otherwise, it is considered that no beam failure event occurs, and the counter is reset. Or, assuming that an initial value of the timer is the maximum value, after receiving beam failure indicator information from the physical layer, the upper-layer of the terminal controls the counter corresponding to the target beam to decrease by one. If the counter reaches 0 before the timer corresponding to the target beam expires, it is determined that a beam failure event occurs; otherwise, it is considered that no beam failure event occurs, and the counter is reset. A beam failure recovery procedure is triggered in a case that the terminal determines that a beam failure event occurs.

Taking one BWP corresponding to one independent counter as an example, when a BWP indicated by BWP identifier information determined by the upper-layer of the terminal in beam failure indicator information is the same as a BWP corresponding to a counter for beam failure detection, the counter for beam failure detection is controlled to increase or decrease after the beam failure indicator information is received.

Taking one beam corresponding to one independent counter as an example, when a beam indicated by beam identifier information determined by the upper-layer of the terminal in the beam failure indicator information is the same as a beam corresponding to a counter for beam failure detection, the counter for beam failure detection is controlled to increase or decrease after the beam failure indicator information is received.

Scenario 2: in a case that the configuration information is configuration information reconfigured by the network device, that is, it is not the first time that the network device configures configuration information used for beam failure detection for the terminal. The reconfiguration process is a process of updating configuration for beam failure detection, such as deleting or adding certain configuration information used for beam failure detection, or reconfiguring one or more parameters in the previous configuration information. In order to reduce a resource overhead, the configuration information may only carry changed parameters without carrying all in the configuration. Optionally, the configuration information may include at least one of the following information: 1) deleted or added cell identifier information, used to indicate that a cell corresponding to the beam failure detection configuration is deleted or added, for example, a cell is deleted or added in a same radio resource control (Radio Resource Control, RRC) configuration message; 2) deleted or added BWP identifier information, used to indicate that a BWP corresponding to the beam failure detection configuration is deleted or added, for example, a BWP is deleted or added in a same RRC configuration message; 3) deleted or added beam identifier information, used to indicate that a beam corresponding to the beam failure detection configuration is deleted or added, for example, a beam is deleted or added in a same RRC configuration message; 4) indication information for deleting the configuration information, used to indicate to delete original configuration information; 5) indicator information for adding configuration information, used to indicate to add new configuration information on basis of original configuration information; 6) updating information of a target parameter value in the configuration information, used to indicate a target parameter that needs to be changed in original configuration information and the value of the target parameter after the change, such as changing a duration of a timer or a maximum count of a counter, etc; 7) indicator information for changing a BWP, used to instruct the terminal to change a BWP, wherein a way for changing a BWP includes, but is not limited to, BWP switching, that is, one BWP is activated and another BWP is deactivated at the same time; or a BWP corresponding to a certain timer for beam failure detection is deactivated, or a BWP corresponding to a certain timer for beam failure detection is activated, etc.; or 8) indicator information for beam modification, used to instruct the terminal to change a beam. A way for changing a beam includes, but is not limited to, sending by a network device to a terminal, change indicator information indicating a serving (or active) beam identifier, for example, an identifier of a new serving (or active) beam is indicated through a PDCCH or MAC CE.

In the present scenario, Step 12 includes: performing, according to the received configuration information (reconfiguration), one of following operations on the timer for beam failure detection corresponding to the target beam: starting the timer, restarting the timer, or stopping the timer.

Correspondingly, Step 12 may also include: resetting, according to the received configuration information (reconfiguration), the counter for beam failure detection corresponding to the target beam, for example, the counter is set to a value of 0 or to a maximum count.

In a beam failure detection method in an embodiment of the present disclosure, a timer and/or a counter for beam failure detection configured for the terminal corresponds to the target beam, which may improve accuracy of beam failure detection and avoid a waste of resources caused by available beams being misjudged as unavailable.

The above embodiments respectively describe in detail the beam failure detection method in different scenarios. The following embodiments will further introduce its corresponding terminal in combination with the accompanying drawings.

Figure 2:
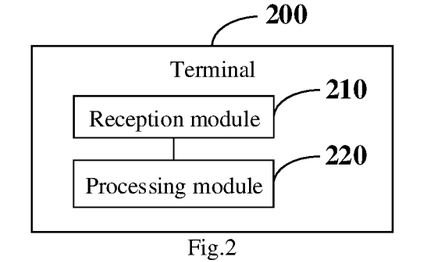
FIG. 2 is a schematic structural diagram illustrating modules of a terminal according to an embodiment of the present disclosure.

As shown in FIG. 2, a terminal 200 of an embodiment of the present disclosure may implement the details of the method in the above embodiment including receiving configuration information used for beam failure detection and performing, according to the received configuration information, a preset operation on a timer and/or a counter for beam failure detection corresponding to a target beam. The same effect may be achieved, where the target beam is one of beams supported by the terminal, or a beam corresponding to a Bandwidth Part (BWP) supported by the terminal. The terminal 200 specifically includes the following functional modules: a reception module 210 and a processing module 220.

The reception module 210 is used to receive configuration information used for beam failure detection.

The processing module 220 is used to perform, according to the received configuration information, a preset operation on a timer and/or a counter for beam failure detection corresponding to a target beam; wherein, the target beam is one of beams supported by the terminal, or a beam corresponding to a Bandwidth Part (BWP) supported by the terminal.

In a case that the configuration information is configuration information configured by the network device for the first time, the configuration information includes at least one of: timer information; counter information; BWP identifier information corresponding to the timer information; BWP identifier information corresponding to the counter information; beam identifier information corresponding to the timer information; or beam identifier information corresponding to the counter information.

The beam identifier information includes at least one of: Synchronous Signal Block (SSB) identifier information, Channel State Information-Reference Signal (CSI-RS) identifier information, or spatial relationship configuration identifier information among beams.

A BWP indicated by the BWP identifier information is an activated BWP or a deactivated BWP, and a beam indicated by the beam identifier information is a serving beam or a non-serving beam.

The processing module 220 includes: a first processing submodule, used to control, in a case that a physical layer detects that a beam failure instance occurs on the target beam, the physical layer to send beam failure indicator information to an upper-layer; a second processing submodule, used to perform, according to the received configuration information, the preset operation on the timer and/or the counter for beam failure detection corresponding to the target beam after the upper-layer receives the beam failure indication information.

The beam failure indicator information includes at least one of: BWP identifier information corresponding to the target beam or beam identifier information corresponding to the target beam.

The processing module 220 further includes: a third processing submodule, used to start or restart a timer corresponding to the target beam in a case that a beam failure instance occurring on the target beam is detected; a fourth processing submodule, used to control a counter corresponding to the target beam to increase or decrease by one in a case that a beam failure instance occurring on the target beam is detected.

In a case that the configuration information is configuration information reconfigured by the network device, the configuration information includes at least one of following: deleted or added cell identifier information; deleted or added BWP identifier information; deleted or added beam identifier information; indication information for deleting the configuration information; indication information for adding the configuration information; update information of a value of a target parameter in the configuration information; indication information for BWP modification; or indication information for beam modification.

The processing module 220 further includes: a fifth processing submodule, used to perform, according to the received configuration information, one of following operations on the timer for beam failure detection corresponding to the target beam: starting the timer, restarting the timer, and stopping the timer.

The processing module 220 further includes a sixth processing submodule, used to reset, according to the received configuration information, the counter for beam failure detection corresponding to the target beam.

It should be noted that, a timer and/or a counter for beam failure detection in the terminal of an embodiment of the present disclosure correspond to the target beam, which may improve accuracy of beam failure detection and avoid a waste of resources caused by available beams being misjudged as unavailable.

Figure 3:
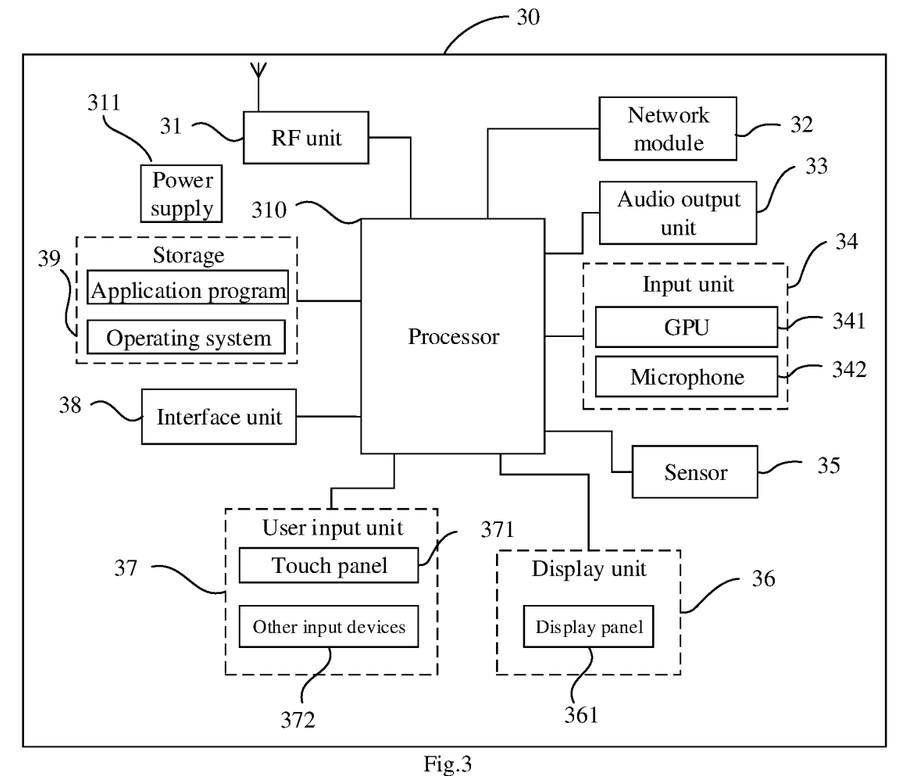
FIG. 3 is a block diagram of a terminal according to an embodiment of the present disclosure.

In order to better achieve the above purpose, further, FIG. 3 is a schematic diagram of a hardware structure of a terminal that implements various embodiments of the present disclosure. The terminal 30 includes, but is not limited to, a radio frequency unit 31, a network module 32, and an audio output unit 33, an input unit 34, a sensor 35, a display unit 36, a user input unit 37, an interface unit 38, a storage 39, a processor 310, and a power supply 311 and other components. Those skilled in the art may understand that the structure of the terminal shown in FIG. 3 does not constitute a limitation on the terminal, and the terminal may include more or fewer components than shown in the figure, or some combined components, or different arrangements of components. In an embodiment of the present disclosure, the terminal includes, but is not limited to, a mobile phone, a tablet computer, a notebook computer, a palmtop computer, a car terminal, a wearable device, a pedometer, and the like.

The radio frequency unit 31 is used to receive configuration information used for beam failure detection.

The processor 310 is used to perform, according to the received configuration information, a preset operation on a timer and/or a counter for beam failure detection corresponding to a target beam; where the target beam is one of beams supported by the terminal, or a beam corresponding to a Bandwidth Part (BWP) supported by the terminal.

A timer and/or a counter for beam failure detection in the terminal of an embodiment of the present disclosure correspond to the target beam, which may improve accuracy of beam failure detection and avoid a waste of resources caused by available beams being misjudged as unavailable.

It should be understood that, in an embodiment of the present disclosure, the radio frequency unit 31 may be used to receive and send information or send and receive signals during a call. Specifically, downlink data from a base station is received by the radio frequency unit 31 and is sent to the processor 310 for processing; in addition, uplink data is sent to the base station. Generally, the radio frequency unit 31 includes, but is not limited to, an antenna, at least one amplifier, a transceiver, a coupler, a low-noise amplifier, a duplexer, and the like. In addition, the radio frequency unit 31 may also communicate with a network and other devices through a wireless communication system.

The terminal provides users with wireless broadband internet access through the network module 32, such as helping users to send and receive an email, to browse web pages, and to access streaming media, etc.

The audio output unit 33 may convert audio data received by the radio frequency unit 31 or the network module 32 or stored in the storage 39 into audio signals and output them as sound. Moreover, the audio output unit 33 may also provide audio output (for example, call signal reception sound, message reception sound, etc.) related to a specific function performed by the terminal 30. The audio output unit 33 includes a speaker, a buzzer, a receiver, and the like.

The input unit 34 is used to receive audio signals or video signals. The input unit 34 may include a graphics processing unit (Graphics Processing Unit, GPU) 341 and a microphone 342, and the graphics processing unit 341 processes image data of a still picture or video obtained by an image capture device (such as a camera) in a video capture mode or an image capture mode. The processed image frames may be displayed on the display unit 36. The image frames processed by the graphics processing unit 341 may be stored in the storage 39 (or other storage medium) or transmitted via the radio frequency unit 31 or the network module 32. The microphone 342 may receive sound, and may process such sound into audio data. The processed audio data may be converted into an output format that may be transmitted to a mobile communication base station via the radio frequency unit 31 in the case of a telephone call mode.

The terminal 30 further includes at least one sensor 35, such as a light sensor, a motion sensor, and other sensors. Specifically, the light sensor includes an ambient light sensor and a proximity sensor, wherein the ambient light sensor may adjust brightness of a display panel 361 according to brightness of the ambient light, and the proximity sensor may turn off the display panel 361 and/or backlight in a case that the terminal 30 is moved to an ear. As a type of the motion sensor, an accelerometer sensor may detect a magnitude of acceleration in various directions (usually three axes), and detect a magnitude and direction of gravity in the case of stationary, and be used to identify attitude of the terminal (such as horizontal and vertical screen switching, related games, magnetometer attitude calibration), vibration recognition related functions (such as pedometer, tap), etc.; the sensor 35 may also include a fingerprint sensor, a pressure sensor, an iris sensor, a molecular sensor, a gyroscope, a barometer, a hygrometer, a thermometer, an infrared sensor and the like, which are not repeated here.

The display unit 36 may be configured to display information inputted by the user or information provided to the user. The display unit 36 may include the display panel 361, and the display panel 361 may be configured as a form of a liquid crystal display (Liquid Crystal Display, LCD), an organic light-emitting diode (Organic Light-Emitting Diode, OLED) or the like.

The user input unit 37 may be used to receive numeric information or character information inputted by a user and generate a signal input related to the user's settings and related to the function control of the terminal. Specifically, the user input unit 37 includes a touch panel 371 and other input devices 372. The touch panel 371, also referred to as a touch screen, may collect the user's touch operations thereon or nearby (such as the user's operation on the touch panel 371 or near the touch panel 371 using any suitable object or accessory such as a finger or a stylus). The touch panel 371 may include two parts, namely a touch detection device and a touch controller. The touch detection device detects a touch orientation of the user, and detects a signal generated by the touch operation, and transmits the signal to the touch controller; the touch controller receives touch information from the touch detection device, converts the touch information into a coordinate of a touch point, transmits the coordinate to the processor 310, and may receive and execute a command from the processor 310. In addition, the touch panel 371 can be implemented in various types such as resistive, capacitive, infrared, and surface acoustic waves, etc. In addition to the touch panel 371, the user input unit 37 may further include other input devices 372. Specifically, the other input devices 372 may include, but are not limited to, a physical keyboard, a function button (such as a volume control button, a switch button, etc.), a trackball, a mouse, and a joystick, and details thereof are not described herein again.

Further, the touch panel 371 may cover the display panel 361, in a case that the touch screen 371 detects a touch operation thereon or nearby, the touch operation is transmitted to the processor 310 to determine the type of a touch event, then the processor 310 provides a corresponding visual output on the display panel 361 based on the type of the touch event. Although in FIG. 3, the touch panel 371 and the display panel 361 are implemented as two independent components to implement input and output functions of the terminal, the touch panel 371 and the display panel 361 may be integrated in some embodiments to implement the input and output functions of the terminal, which are not limited here.

The interface unit 38 is an interface through which an external device is connected to the terminal 30. For example, the external device may include a wired or wireless headset port, an external power supply (or battery charger) port, a wired or wireless data port, a storage card port, a port for connecting a device with an identification module, and an audio input/output (I/O) port, a video I/O port, or a headphone port, etc. The interface unit 38 may be used to receive input (e.g., data information, power, etc.) from the external device and transmit the received input to one or more elements within the terminal 30 or may be used to transmit data between the terminal 30 and the external device.

The storage 39 may be used to store software programs and various data. The storage 39 may mainly include a storage program area and a storage data area, wherein the storage program area may store an operating system, an application program (such as a sound playback function, an image playback function, etc.) required for at least one function, and the like; the storage data area may store data (such as audio data, a phone book, etc.) created based on the use of a mobile phone and the like. In addition, the storage 39 may include a high-speed random access storage, and may further include a non-volatile storage, such as at least one magnetic disk storage device, a flash memory device, or other volatile solid-state storage device.

The processor 310 is a control center of the terminal, and uses various interfaces and lines to connect various parts of the entire terminal. By running or executing software programs and/or modules stored in the storage 39 and calling data stored in the storage 39, various functions of the terminal and processing data are performed, so that the overall monitoring of the terminal is performed. The processor 310 may include one or more processing units; optionally, the processor 310 may integrate an application processor and a modem processor, wherein the application processor mainly processes an operating system, a user interface, and an application program, etc. The modem processor mainly handles wireless communication. It could be understood that the modem processor may not be integrated into the processor 310.

The terminal 30 may further include a power source 311 (such as a battery) for supplying power to various components. Optionally, the power supply 311 may be logically connected to the processor 310 through a power management system, so as to implement functions such as management of charging, management of discharging, and power consumption management through the power management system.

In addition, the terminal 30 includes some functional modules that are not shown, and details are not described herein again.

Optionally, an embodiment of the present disclosure further provides a terminal, and the terminal includes: a processor 310, a storage 39, and a computer program stored in the storage 39 and executable on the processor 310. When the computer program is executed by the processor 310, the processor 310 implements various processes in the method embodiment of the method for beam failure detection, and the same technical effect may be achieved, which will not be repeated herein to avoid repetition. The terminal may be a wireless terminal or a wired terminal, and the wireless terminal may be a device that provides voice and/or other service data connectivity to the user, a handheld device having a wireless connecting function, or another processing device connected to a wireless modem. The wireless terminal may communicate with one or more core networks via a radio access network (Radio Access Network, RAN), and the wireless terminal may be a mobile terminal, such as a mobile phone (or referred to as "cellular" phone) and a computer having a mobile terminal, for example, a portable device, a pocket device, a handheld device, a computer built-in device or an in-vehicle mobile device that exchanges language and/or data with a wireless access network, for example, a personal communication service (Personal Communication Service, PCS) telephone, a cordless telephone, a session initiation protocol (Session Initiation Protocol, SIP) telephone, a wireless local loop (Wireless Local Loop, WLL) station, a personal digital assistant (Personal Digital Assistant, PDA) and other devices. The wireless terminal may also be referred to as a system, a subscriber unit (Subscriber Unit), a subscriber station (Subscriber Station), a mobile station (Mobile Station), a mobile (Mobile), a remote station (Remote Station), a remote terminal (Remote Terminal), and an access terminal (Access Terminal), a user terminal (User Terminal), a user agent (User Agent), or a user equipment (User Equipment or a User Device), which are not limited herein.

An embodiment of the present disclosure also provides a computer readable storage medium, a program is stored on the computer readable storage medium, and when the program is executed by a processor, the processor implements various processes in embodiments of the beam failure detection method, and the same technical effect may be achieved, which will not be repeated herein to avoid repetition. The computer readable storage medium may be, for example, a read-only memory (Read-Only Memory, ROM), a random access memory (Random Access Memory, RAM), a magnetic disk or an optical disk, etc.

The above embodiments introduce the beam failure detection method of the present disclosure from the terminal side, and the present disclosure will further introduce an information configuration method at a network device side with reference to the accompanying drawings.

Figure 4:
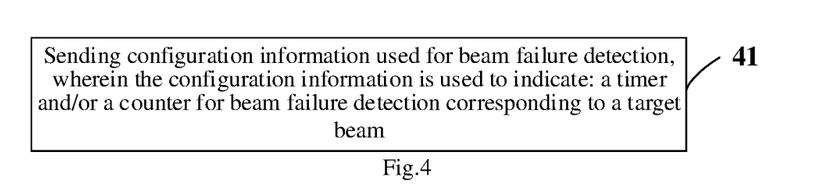
FIG. 4 is a schematic flowchart of an information configuration method according to an embodiment of the present disclosure.

As shown in FIG. 4, an embodiment of the present disclosure provides an information configuration method. The method is performed by a network device side and includes the following steps.

Step 41: sending configuration information used for beam failure detection.

The configuration information is used to indicate: a timer and/or a counter for beam failure detection corresponding to a target beam, the target beam is one of beams supported by a terminal, or a beam corresponding to a Bandwidth Part (BWP) supported by a terminal. That is, the timer used for beam failure detection in the configuration information corresponds to one of the beams supported by the terminal, or the timer corresponds to the beam corresponding to the BWP supported by the terminal. The counter used for beam failure detection in the configuration information corresponds to one of the beams supported by the terminal, or the counter corresponds to the beam corresponding to the BWP supported by the terminal. In this way, a timer and/or a counter used for beam failure detection correspond to a smaller number of beams, which may improve accuracy of beam failure detection and avoid a waste of resources caused by available beams being misjudged as unavailable.

The present embodiment will further illustrate the information configuration method in combination with different scenarios in the following.

Scenario 1: in a case that the configuration information is configuration information configured by the network device for the first time, that is, when the network device configures configuration information used for beam failure detection for the terminal for the first time, the configuration information may include at least one of the following information: 1) timer information, used to indicate a timer configuration for beam failure detection, such as detection time of failure detection; 2) counter information, used to indicate a counter configuration for beam failure detection, such as the maximum count of failure detection instances; 3) BWP identifier information corresponding to the timer information, used to indicate a BWP corresponding to the timer information, wherein, one BWP corresponds to one independent timer, and values of timers corresponding to different BWPs may be the same or different; 4) BWP identifier information corresponding to the counter information, used to indicate a BWP corresponding to the counter information, wherein, one BWP corresponds to one independent counter, and values of counters corresponding to different BWPs may be the same or different, in other words, the maximum count of beam failure detection instances corresponding to different BWPs may be the same or different; 5) beam identifier information corresponding to the timer information, in other words, a beam identifier corresponding to a timer configuration for beam failure detection in the configuration information for beam failure detection, used to indicate a beam corresponding to the timer information, wherein one beam corresponds to one independent timer, and values of timers corresponding to different beams may be the same or different; or 6) beam identifier information corresponding to the counter information, in other words, a beam identifier corresponding to a counter configuration for beam failure detection in the configuration information for beam failure detection, used to indicate a beam corresponding to the counter information; one beam corresponds to one independent counter, and values of counters corresponding to different beams may be the same or different, in other words, maximum counts of beam failure detection instances corresponding to different beams may be the same or different.

The beam identifier information includes at least one of following: synchronous signal block (Synchronous Signal Block, SSB) identifier information, such as a SSB identifier; channel state information-reference signal (Channel State Information-Reference Signal, CSI-RS) identifier information, such as a CSI-RS identifier; or spatial relationship configuration identifier information among beams, where spatial relationship configuration information includes but is not limited to: transmission configuration indicator (Transmission Configuration Indicator, TCI) information, or quasi-co location (Quasi-co Location, QCL) relationship information. The QCL relationship indicates that at least one of a Doppler frequency offset, a Doppler spread, an average delay, a delay spread, or a spatial reception parameter among different beams is quasi co-located.

A BWP indicated by the BWP identifier information is an activated BWP or a deactivated BWP, and a beam indicated by the beam identifier information is a serving beam (or called an activated beam) or a non-serving beam (or called a deactivated beam).

Scenario 2: in a case that the configuration information is configuration information reconfigured by the network device, that is, it is not the first time that the network device configures configuration information used for beam failure detection for the terminal. The reconfiguration process is a process of updating configuration for beam failure detection, such as deleting or adding certain configuration information used for beam failure detection, or reconfiguring one or more parameters in the previous configuration information. In order to reduce a resource overhead, the configuration information may only carry changed parameters without carrying all in the configuration. Optionally, the configuration information may include at least one of the following information: 1) deleted or added cell identifier information, used to indicate that a cell corresponding to the beam failure detection configuration is deleted or added, for example, a cell is deleted or added in a same radio resource control (Radio Resource Control, RRC) configuration message; 2) deleted or added BWP identifier information, used to indicate that a BWP corresponding to the beam failure detection configuration is deleted or added, for example, a BWP is deleted or added in a same RRC configuration message; 3) deleted or added beam identifier information, used to indicate that a beam corresponding to the beam failure detection configuration is deleted or added, for example, a beam is deleted or added in a same RRC configuration message; 4) indication information for deleting the configuration information, used to indicate to delete original configuration information; 5) indicator information for adding configuration information, used to indicate to add new configuration information on basis of original configuration information; 6) updating information of a target parameter value in the configuration information, used to indicate a target parameter that needs to be changed in original configuration information and the value of the target parameter after the change, such as changing a duration of a timer or a maximum count of a counter, etc.; 7) indicator information for changing a BWP, used to instruct the terminal to change a BWP, wherein a way for changing a BWP includes, but is not limited to, BWP switching, that is, one BWP is activated and another BWP is deactivated at the same time; or a BWP corresponding to a certain timer for beam failure detection is deactivated, or a BWP corresponding to a certain timer for beam failure detection is activated, etc.; or 8) indicator information for beam modification, used to instruct the terminal to change a beam. A way for changing a beam includes, but is not limited to, sending by a network device to a terminal, change indicator information indicating a serving (or active) beam identifier, for example, an identifier of a new serving (or active) beam is indicated through a PDCCH or MAC CE. In the information configuration method of an embodiment of the present disclosure, the network device sends configuration information used for beam failure detection to the terminal, a timer and/or a counter indicated by the configuration information corresponds to a smaller number of beams, which may improve accuracy of beam failure detection and avoid a waste of resources caused by available beams being misjudged as unavailable.

The above embodiments respectively describe in detail the information configuration method in different scenarios. The following embodiments will further introduce a network device corresponding to the information configuration method in combination with the accompanying drawings.

Figure 5:
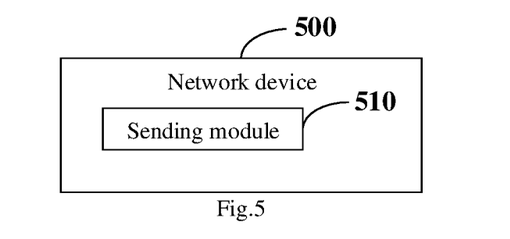
FIG. 5 is a schematic structural diagram illustrating a module of a network device according to an embodiment of the present disclosure.

As shown in FIG. 5, a network device 500 of an embodiment of the present disclosure may implement details of a method for sending configuration information used for beam failure detection in the above embodiment, and achieve the same effect, where the configuration information is used to indicate a timer and/or a counter for beam failure detection corresponding to a target beam, the target beam is one of beams supported by a terminal, or a beam corresponding to a Bandwidth Part (BWP) supported by a terminal. The network device 500 specifically includes a sending module 510.

The sending module 510 is used to send configuration information used for beam failure detection; where the configuration information is used to indicate: a timer and/or a counter for beam failure detection corresponding to a target beam, the target beam is one of beams supported by a terminal, or a beam corresponding to a Bandwidth Part (BWP) supported by a terminal.

In a case that the configuration information is configuration information configured by the network device for the first time, the configuration information includes at least one of following: timer information; counter information; BWP identifier information corresponding to the timer information; BWP identifier information corresponding to the counter information; beam identifier information corresponding to the timer information; or beam identifier information corresponding to the counter information.

The beam identifier information includes at least one of: Synchronous Signal Block (SSB) identifier information, Channel State Information-Reference Signal (CSI-RS) identifier information, or spatial relationship configuration identifier information among beams.

A BWP indicated by the BWP identifier information is an activated BWP or a deactivated BWP, and a beam indicated by the beam identifier information is a serving beam or a non-serving beam.

In a case that the configuration information is configuration information reconfigured by the network device, the configuration information includes at least one of: deleted or added cell identifier information; deleted or added BWP identifier information; deleted or added beam identifier information; indicator information for deleting the configuration information; indicator information for adding the configuration information; update information of a value of a target parameter in the configuration information; indicator information for BWP modification; or indicator information for beam modification.

It should be noted that a division to modules in the above terminal is only a division in terms of logical functions. In actual implementation, the modules may be entirely or partially integrated into one physical entity, or may be physically separated. The modules may all be implemented in a form of software called by a processing component; or may all be implemented in a form of hardware, or some of the modules may be implemented in the form of software called by a processing component, and some of the modules are implemented in the form of hardware. For example, the determination module may be a processing component arranged independently, or may be integrated in a chip of the above-mentioned devices. In addition, the determination module may also be stored in the storage of the above device in a form of program codes called and executed by a processing component of the above device to implement the function of the determination module. Implementation of other modules is similar. In addition, all or a part of these modules may be integrated or implemented independently. The processing components described herein may be an integrated circuit having a processing capability of signals. In an implementation process, each step of the above method or each of the above modules may be completed by an integrated logic circuit in hardware in the processor component or by an instruction in a form of software.

For example, the above modules may be one or more integrated circuits configured to implement the above method, such as one or more application specific integrated circuits (Application Specific Integrated Circuit, ASIC), or one or more digital signal processors (digital signal processor, DSP), or, one or more field programmable gate arrays (Field Programmable Gate Array, FPGA), etc. As another example, when one of the above modules is implemented in a form of program codes invoked by a processing component, the processing component may be a general purpose processor, such as a central processing unit (Central Processing Unit, CPU) or another processor capable of calling the program codes. As another example, these modules may be integrated and implemented in a form of a system-on-a-chip (system-on-a-chip, SOC).

It should be noted that, the network device of an embodiment of the present disclosure sends configuration information used for beam failure detection to the terminal, a timer and/or a counter used for beam failure detection indicated by the configuration information corresponds to a smaller number of beams, which may improve accuracy of beam failure detection and avoid a waste of resources caused by available beams being misjudged as unavailable.

In order to better achieve the above purpose, an embodiment of the present disclosure also provides a network device including a processor and a storage, the storage stores a program executable by the processor, and when the program is executed by the processor, the processor implements steps of the information configuration method as described above. An embodiment of the present disclosure also provides a computer readable storage medium including a program stored thereon, and when the program is executed by a processor, the processor implements steps of the information configuration method as described above.

Figure 6:
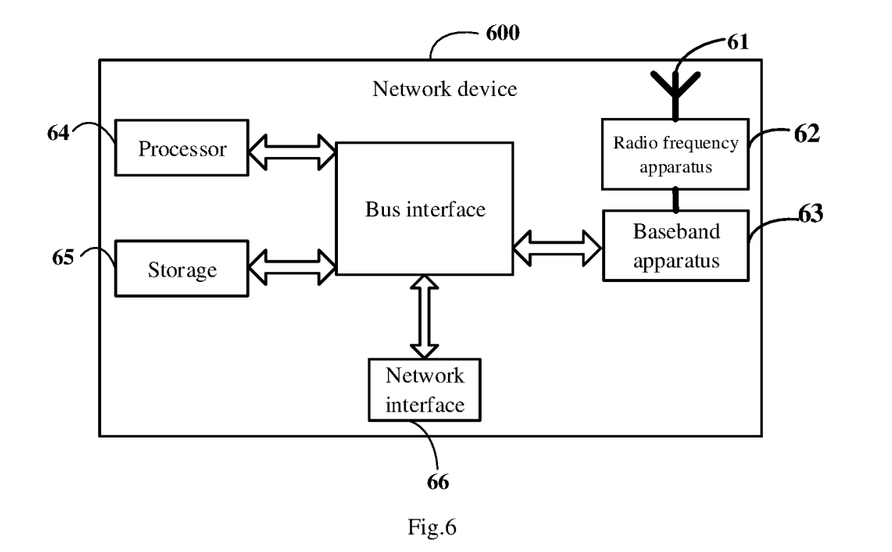
FIG. 6 is a block diagram of a network device according to an embodiment of the present disclosure.

Specifically, an embodiment of the present disclosure also provides a network device. As shown in FIG. 6, the network device 600 includes: an antenna 61, a radio frequency apparatus 62, and a baseband apparatus 63. The antenna 61 is connected to the radio frequency apparatus 62. In an uplink direction, the radio frequency apparatus 62 receives information via the antenna 61 and transmits the received information to the baseband apparatus 63 for processing. In a downlink direction, the baseband apparatus 63 processes information to be transmitted and transmits the information to the radio frequency apparatus 62. The radio frequency apparatus 62 processes the received information and transmits it via the antenna 61.

The frequency band processing device may be arranged in the baseband apparatus 63, and the method performed by the above network device in the embodiments may be implemented in the baseband apparatus 63, which includes a processor 64 and a storage 65.

The baseband apparatus 63 may include, for example, at least one baseband board on which a plurality of chips are disposed, as shown in FIG. 6, and one of the chips is, for example, the processor 64 connected to the storage 65 to call a program in the storage 65 to perform an operation of the network device shown in the above method embodiment.

The baseband apparatus 63 may further include a network interface 66 for interacting with the radio frequency apparatus 62, and the interface is, for example, a common public radio interface (common public radio interface, referred to as CPRI).

The processor here may be a processor or a collective name of a plurality of processing components. For example, the processor may be a CPU, an ASIC, or one or more integrated circuits configured to implement the method performed by the above network device, such as one or more digital signal processors (DSPs), or one or more field programmable gate arrays (FPGAs), etc. The storage element may be a storage or a collective name of a plurality of storage elements.

The storage 65 may be either a volatile storage or a non-volatile storage, or may include both a volatile storage and a non-volatile storage. The non-volatile storage may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM) or a flash memory. The volatile storage may be a random access memory (Random Access Memory, RAM) that acts as an external cache. By way of example and not limitation, many forms of RAM are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchlink dynamic random access memory (Synchlink DRAM, SLDRAM) and a direct rambus random access memory (Direct Rambus RAM, DRRAM). The storage 65 described herein is intended to include, but is not limited to, these and any other suitable types of storage.

Specifically, the network device of the embodiment of the present disclosure further includes: a program stored in the storage 65 and executable by the processor 64. The processor 64 calls the program in the storage 65 to execute the method executed by each module shown in FIG. 5.

Specifically, when the program may be used to execute when called by the processor 64: sending configuration information used for beam failure detection; wherein the configuration information is used to indicate: a timer and/or a counter for beam failure detection corresponding to a target beam, the target beam is one of beams supported by a terminal, or a beam corresponding to a Bandwidth Part (BWP) supported by a terminal.

In a case that the configuration information is configuration information configured by the network device for the first time, the configuration information includes at least one of: timer information; counter information; BWP identifier information corresponding to the timer information; BWP identifier information corresponding to the counter information; beam identifier information corresponding to the timer information; or beam identifier information corresponding to the counter information.

The beam identifier information includes at least one of: Synchronous Signal Block (SSB) identifier information, Channel State Information-Reference Signal (CSI-RS) identifier information, or spatial relationship configuration identifier information among beams.

A BWP indicated by the BWP identifier information is an activated BWP or a deactivated BWP, and a beam indicated by the beam identifier information is a serving beam or a non-serving beam.

In a case that the configuration information is configuration information reconfigured by the network device, the configuration information includes at least one of: deleted or added cell identifier information; deleted or added BWP identifier information; deleted or added beam identifier information; indicator information for deleting the configuration information; indicator information for adding the configuration information; update information of a value of a target parameter in the configuration information; indicator information for BWP modification; or indicator information for beam modification.

The network device may be a base station (Base Transceiver Station, BTS) in a global system of mobile communication (Global System of Mobile communication, GSM) or code division multiple access (Code Division Multiple Access, CDMA), a NodeB (NodeB, NB) in wideband code division multiple access (Wideband Code Division Multiple Access, WCDMA), an evolutional Node B (Evolutional Node B, eNB or eNodeB) in LTE, or a relay station or an access point, or a base station in a future 5G network, etc., which is not limited here.

The network device of an embodiment of the present disclosure sends configuration information used for beam failure detection to the terminal, a timer and/or a counter used for beam failure detection indicated by the configuration information corresponds to a smaller number of beams, which may improve accuracy of beam failure detection and avoid a waste of resources caused by available beams being misjudged as unavailable.

Those of ordinary skills in the art will appreciate that elements and algorithm steps of various examples described in the embodiments disclosed herein may be implemented in electronic hardware or a combination of computer software and electronic hardware. Whether these functions are performed in hardware or software depends on a specific application and design constraints of a technical solution. A person skilled in the art may use different methods to implement described functions for each particular application, but such implementation should not be considered to go beyond the scope of the present disclosure.

A person skilled in the art may clearly understand that for convenience and brevity of the description, a specific working process of the system, the device and the unit described above may be obtained by referring to a corresponding process in the foregoing method embodiments, and details thereof are not described herein again.

In embodiments provided in the present application, it should be understood that the disclosed devices and methods may be implemented in other manners. For example, the device embodiments described above are merely illustrative. For example, the device embodiments described above are merely illustrative. For example, a division of units is only a logical function division. In actual implementation, there may be another division manner, for example, a plurality of units or components may be combined or may be integrated into another system, or some features may be ignored or not be executed. In addition, mutual coupling or direct coupling or communication connection shown or discussed may be an indirect coupling or communication connection through some interfaces, devices or units, and may be in an electrical, mechanical or other form.

Units described as separate components may or may not be physically separated, and the components displayed as units may or may not be physical units, that is, may be located in one place, or may be distributed on multiple network units. Some or all of the units may be selected based on actual needs to achieve the purpose of the technical solutions of the embodiments.

In addition, each functional unit in various embodiments of the present disclosure may be integrated into one processing unit, or each unit may exist physically separately, or two or more units may be integrated into one unit.

If the functions are implemented in the form of software functional units and sold or used as an independent product, the software functional units may also be stored in a computer readable storage medium. Based upon such understanding, the technical solutions of the present disclosure essentially or a part thereof contributing to the prior art may be embodied in the form of a computer software product which may be stored in a storage medium and which includes several instructions to cause a computer device (which may be a personal computer, a server, or a network device, etc.) to perform all or some steps of the method according to the respective embodiments of the present disclosure. The foregoing storage medium includes various media that may store program codes, such as a USB flash drive, a mobile hard disk, a ROM, a RAM, a magnetic disk, or an optical disk.

In addition, it should be noted that in the device and the method of the present disclosure, it is apparent that various components or various steps may be decomposed and/or recombined. The decomposition and/or recombination should be considered as equivalents of the present disclosure. Also, the steps of performing the above-described series of processes may naturally be performed in a chronological order or in an order illustrated, but not necessarily be required to be performed in a chronological order, and some steps may be performed in parallel or independently of each other. It will be appreciated by those skilled in the art that all or any of the steps or components of the methods and devices of the present disclosure may be implemented in any computing device (including a processor, a storage medium, etc.) or a computing device network, in forms of hardware, firmware, software, or a combination thereof, which may be implemented by these of ordinary skills in the art using their basic programming skills after they read the description of the present disclosure.

Accordingly, the objects of the present disclosure may also be achieved by running a program or a set of programs on any computing device. The computing device may be a well-known general purpose device. Accordingly, the objects of the present disclosure may also be realized by merely providing a program product including a program code for implementing the method or device. That is to say, such a program product also constitutes the present disclosure, and a storage medium storing such a program product also constitutes the present disclosure. It will be apparent that the storage medium may be any known storage medium or any storage medium developed in the future. It should also be noted that in the device and the method of the present disclosure, it is apparent that various components or steps may be decomposed and/or recombined. The decomposition and/or recombination should be considered as equivalents of the present disclosure. Also, the steps of performing the series of processes described above may naturally be performed in the chronological order in the order illustrated, but not necessarily be required to be performed in the chronological order. Certain steps may be performed in parallel or independently of one another.

The descriptions above are optional embodiments of the disclosure, it should be noted that improvements and embellishments may be made by one skilled in the art within the scope of the tenets of the present disclosure, and such improvements and embellishments shall be within the protection scope of the present disclosure.

What is claimed is:

1. A beam failure detection method, performed by a terminal side, comprising:
   receiving configuration information used for beam failure detection;
   performing, according to the received configuration information, a preset operation on a counter for beam failure detection corresponding to a target beam; wherein, the target beam is one of beams supported by the terminal, or a beam corresponding to a Bandwidth Part (BWP) supported by the terminal;
   wherein, in a case that the configuration information is reconfigured by a network device, the configuration information includes at least one of:
   indicator information for deleting the configuration information;
   indicator information for beam modification;
   deleted or added beam identifier information;
   wherein performing, according to the received configuration information, the preset operation on the counter for beam failure detection corresponding to the target beam comprises:
   resetting, according to the received configuration information reconfigured by the network device, the counter for beam failure detection corresponding to the target beam.

2. The beam failure detection method according to claim 1, wherein, in a case that the configuration information is configured by a network device for the first time, the configuration information comprises at least one of:
   counter information;
   BWP identifier information corresponding to the counter information; or,
   beam identifier information corresponding to the counter information.

3. The beam failure detection method according to claim 2, wherein, the beam identifier information comprises at least one of:
   Synchronous Signal Block (SSB) identifier information, Channel State Information-Reference Signal (CSI-RS) identifier information, or spatial relationship configuration identifier information among beams.

4. The beam failure detection method according to claim 2, wherein, a BWP indicated by the BWP identifier information is an activated BWP or a deactivated BWP, and a beam indicated by the beam identifier information is a serving beam or a non-serving beam.

5. The beam failure detection method according to claim 1, wherein performing, according to the received configuration information, the preset operation on the counter for beam failure detection corresponding to the target beam comprises:
   controlling, in a case that a physical layer detects that a beam failure instance occurs on the target beam, the physical layer to send beam failure indicator information to an upper-layer;
   performing, according to the received configuration information, the preset operation on the counter for beam failure detection corresponding to the target beam after the upper-layer receives the beam failure indicator information.

6. The beam failure detection method according to claim 5, wherein, the beam failure indicator information comprises at least one of:
   BWP identifier information corresponding to the target beam or beam identifier information corresponding to the target beam.

7. The beam failure detection method according to claim 1, wherein performing, according to the received configuration information, the preset operation on the counter for beam failure detection corresponding to the target beam comprises:
   controlling the counter corresponding to the target beam to increase or decrease by one in a case that a beam failure instance occurring on the target beam is detected.

8. The beam failure detection method according to claim 1, wherein the configuration information further comprises at least one of:
   deleted or added cell identifier information;
   deleted or added BWP identifier information;
   update information of a target parameter value in the configuration information; or,
   indicator information for BWP modification.

9. A terminal, comprising:
   a processor, a storage and a program stored on the storage and executable by the processor, wherein, when the program is executed by the processor, the processor implements following steps:
   receiving configuration information used for beam failure detection;
   performing, according to the received configuration information, a preset operation on a counter for beam failure detection corresponding to a target beam; wherein, the target beam is one of beams supported by the terminal, or a beam corresponding to a Bandwidth Part (BWP) supported by the terminal;
   wherein, in a case that the configuration information is reconfigured by a network device, the configuration information includes at least one of:
   indicator information for deleting the configuration information;

indicator information for beam modification;
deleted or added beam identifier information;
wherein performing, according to the received configuration information, the preset operation on the counter for beam failure detection corresponding to the target beam comprises:
resetting, according to the received configuration information reconfigured by the network device, the counter for beam failure detection corresponding to the target beam.

10. The terminal according to claim 9, wherein, in a case that the configuration information is configured by a network device for the first time, the configuration information comprises at least one of:
counter information;
BWP identifier information corresponding to the counter information; or
beam identifier information corresponding to the counter information.

11. The terminal according to claim 9, wherein, performing, according to the received configuration information, the preset operation on the counter for beam failure detection corresponding to the target beam comprises:
controlling, in a case that a physical layer detects that a beam failure instance occurs on the target beam, the physical layer to send beam failure indicator information to an upper-layer;
performing, according to the received configuration information, the preset operation on the counter for beam failure detection corresponding to the target beam after the upper-layer receives the beam failure indicator information.

12. The terminal according to claim 9, wherein, performing, according to the received configuration information, the preset operation on the counter for beam failure detection corresponding to the target beam comprises:
controlling the counter corresponding to the target beam to increase or decrease by one in a case that a beam failure instance occurring on the target beam is detected.

13. An information configuration method, performed by a network device side, comprising:
sending configuration information used for beam failure detection; wherein the configuration information is used to indicate: a counter for beam failure detection corresponding to a target beam, the target beam is one of beams supported by a terminal, or a beam corresponding to a Bandwidth Part (BWP) supported by a terminal;
wherein, in a case that the configuration information is reconfigured by a network device, the configuration information includes at least one of:
indicator information for deleting the configuration information;
indicator information for beam modification;
deleted or added beam identifier information;
wherein the configuration information reconfigured by the network device is further used to indicate the terminal to reset the counter for beam failure detection corresponding to the target beam.

14. The information configuration method according to claim 13, wherein, in a case that the configuration information is configured by the network device by the firs time, the configuration information comprises at least one of:
counter information;
BWP identifier information corresponding to the counter information;
beam identifier information corresponding to the counter information.

15. The information configuration method according to claim 13, wherein the configuration information further comprises at least one of:
deleted or added cell identifier information;
deleted or added BWP identifier information;
update information of a target parameter value in the configuration information; or,
indicator information for BWP modification.

16. A network device, comprising:
a processor, a storage and a program stored on the storage and executable by the processor, wherein, when the program is executed by the processor, the processor implements steps of the information configuration method according to claim 13.

17. A computer readable storage medium, wherein the computer readable storage medium stores a program, and when the program is executed by a processor, the processor implements steps of the beam failure detection method according to claim 1.

* * * * *